(12) United States Patent
Russell et al.

(10) Patent No.: US 8,672,371 B1
(45) Date of Patent: Mar. 18, 2014

(54) BUMPER PLUG AND METHOD

(75) Inventors: Jeffrey R. Russell, Winston Salem, NC (US); John R. Bussard, Kernersville, NC (US)

(73) Assignee: Comco Manufacturing, Inc., Greensboro, NC (US)

( * ) Notice: Subject to any disclaimer, the term of this patent is extended or adjusted under 35 U.S.C. 154(b) by 88 days.

(21) Appl. No.: 13/356,847

(22) Filed: Jan. 24, 2012

(51) Int. Cl.
*B60R 19/02* (2006.01)
*B60R 13/02* (2006.01)

(52) U.S. Cl.
USPC .......................................... 293/102; 293/106

(58) Field of Classification Search
USPC .................. 293/102, 106, 122, 149, 154, 155
See application file for complete search history.

(56) References Cited

U.S. PATENT DOCUMENTS

| | | | | |
|---|---|---|---|---|
| 561,783 | A * | 6/1896 | Fuerth | 215/260 |
| 1,519,967 | A * | 12/1924 | Hughes | 293/107 |
| 4,167,282 | A * | 9/1979 | Matsuyama | 293/102 |
| 4,413,748 | A * | 11/1983 | Kessler et al. | 220/281 |
| 4,678,011 | A * | 7/1987 | Weber | 138/96 R |
| 4,799,602 | A * | 1/1989 | Collins et al. | 220/789 |
| 4,979,843 | A * | 12/1990 | Perry | 403/19 |
| 5,503,189 | A * | 4/1996 | Lamendola | 138/96 R |
| 5,997,057 | A * | 12/1999 | Gasko et al. | 293/102 |
| 6,755,451 | B2 * | 6/2004 | Jones | 293/117 |
| 7,147,258 | B2 * | 12/2006 | Evans et al. | 293/120 |
| 7,628,288 | B2 * | 12/2009 | Edwards | 220/233 |
| D659,464 | S * | 5/2012 | Albers et al. | D7/391 |
| D677,203 | S * | 3/2013 | Russell et al. | D12/172 |
| 2005/0236850 | A1 * | 10/2005 | Evans et al. | 293/102 |
| 2009/0090714 | A1 * | 4/2009 | Albers et al. | 220/262 |

OTHER PUBLICATIONS 92-8991 BP-1/30000 Locking Bumper Plug; WirthCo Engineering, Inc.—Locking Bumper Plug; Stag Parkway RV Parts & Accessories Catalog 2006; 2 pages (Catalog cover and p. 532)—also one page wih two (2) digital pictures showing the front and back of the product.
92-8987 40302, 4" plug; CamcoRV—Rubber Bumper Plugs; Stag Parkway RV Parts & Accessories Catalog 2006; 2 pages (Catalog cover and p. 532)—also one page wih two (2) digital pictures showing the front and back of the product.
92-9145 208-A, 4" plugs & 92-8989 329-A, 4-1/4" plugs w/tabs; JR Products Rubber Bumper Plugs; Stag Parkway RV Parts & Accessories Catalog 2006; 2 pages (Catalog cover and p. 532)—also one page wih two (2) digital pictures showing the front and back of the product.
92-8988 10011, 4-1/2" plug; BRD Rubber Bumper Plugs; Stag Parkway RV Parts & Accessories Catalog 2006; 2 pages (Catalog cover and p. 532).

(Continued)

*Primary Examiner* — Glenn Dayoan
*Assistant Examiner* — Gregory Blankenship
(74) *Attorney, Agent, or Firm* — Blake P. Hurt (57) ABSTRACT

A plug for enclosing a bumper compartment of a vehicle which will maintain the compartment pest free, allow air flow therethrough and securely retain accessories placed therein. The plug includes a front, a body and a rear, with the front and rear attached to the body. The front defines a pair of openings while the body and the rear define a pair of cavities. The front openings are in communication with the body cavities to provide a handle for easily grasping the plug for removal and insertion. Apertures are formed in the rear to allow for air flow and also act as an insect screen. The plug also includes grippers attached to the exterior of the body for frictional engagement with the inside of the bumper compartment.

15 Claims, 7 Drawing Sheets

(56) References Cited

OTHER PUBLICATIONS 31-8627 10722 Hinged Bumper Cap; BRD Full Access Hinged Bumper Cap; Stag Parkway RV Parts and Accessories Catalog 2006; 2 pages (Catalog cover and p. 532).

88-9434 40313, RV Bumper Cap, w/Saver; CamcoRV—RV Bumper Cap; Stag Parkway RV Parts & Accessories Catalog 2006; 2 pages (Catalog cover and p. 532).

B&B Molders—Bandbmolders.com—webpage printout—1 page—Bumper Plugs—p. 32 of Accessories Catalog, dated Apr. 2009; also one page wih two (2) digital pictures showing the front and back of the product.

MoCap—Plugs for Square Standard Tubes, webpage printout—5 pages; dated Jan. 23, 2010.

One page with two (2) digital pictures showing the front and back of a Bumper Hatch of Fun, LLC; webpage printout—3 pages; dated Jun. 29, 2009.

\* cited by examiner

BUMPER PLUG AND METHOD

FIELD OF THE INVENTION

The invention herein pertains to removable bumper plugs and particularly pertains to bumper plugs for recreational vehicles (RV) which are quick and easy to manually install or remove and will remain tightly in place during use while allowing air flow therethrough.

DESCRIPTION OF THE PRIOR ART AND OBJECTIVES OF THE INVENTION

Recreational vehicles (RV's) include a variety of storage compartments and the like inside and outside the vehicle including the rear bumpers to maintain necessities such as sewer hoses and attachments, electrical cords, water lines and the like. Various types of caps or plugs are often utilized to close such compartments. Unfortunately over time and use such usual closures can become loose fitting or worn whereby they can inadvertently fall out or become lost during travel, possibly releasing the contents of the compartment to the dismay of the RV occupants. Further, such plugs sometimes include a hole therein for inserting a finger for grasping and removing the plug. Unfortunately such holes allow an infiltration point for insects, bees, snakes and the like which is undesirable and which can be harmful.

Thus, in view of the problems and disadvantages associated with prior plug devices, the present invention was conceived and one of its objectives is to provide a bumper plug for an RV and method of use which is durable, economical and will remain tightly in place during use.

It is another objective of the present invention to provide a bumper plug for an RV bumper compartment having an insect screen.

It is still another objective of the present invention to provide a flexible bumper plug which is easy to install and remove.

It is yet another objective of the present invention to provide a bumper plug which is inexpensive to manufacture and sell.

It is a further objective of the present invention to provide a bumper plug having an easily graspable handle for plug removal and insertion.

It is still a further objective of the present invention to provide a bumper plug that permits the free flow of air into the bumper compartment while simultaneously securing its contents.

Various other objectives and advantages of the present invention will become apparent to those skilled in the art as a more detailed description is set forth below.

SUMMARY OF THE INVENTION

The aforesaid and other objectives are realized by providing a bumper plug formed such as by conventional molding techniques from a low density polyethylene for plugging a bumper compartment of a typical RV. The bumper plug is flexible and includes a pair of cavities therein to allow for easy thumb and multi-finger grasping and flexing for insertion into and removal from the bumper compartment. Apertures are provided in the bottom of the plug cavities to prevent infiltration of various pests and allow air flow. Grippers are formed along the outside walls of the plug body for tightly gripping the interior walls of the bumper compartment to maintain the bumper plug in tight frictional engagement therewith. For example, these grippers may be, but are not limited to sets of stiff ribs that frictionally interact with the inner walls of the bumper compartment.

BRIEF DESCRIPTION OF THE DRAWINGS

The foregoing Summary, as well as the following Detailed Description of the Preferred Embodiments is better understood when read in conjunction with the appended drawings. For the purpose of illustration, there is shown in the drawings exemplary embodiments, however, the presently disclosed invention is not limited to the specific methods and instrumentalities disclosed in the following drawings.

DETAILED DESCRIPTION OF THE PREFERRED EMBODIMENT AND OPERATION OF THE INVENTION

Figure 1:
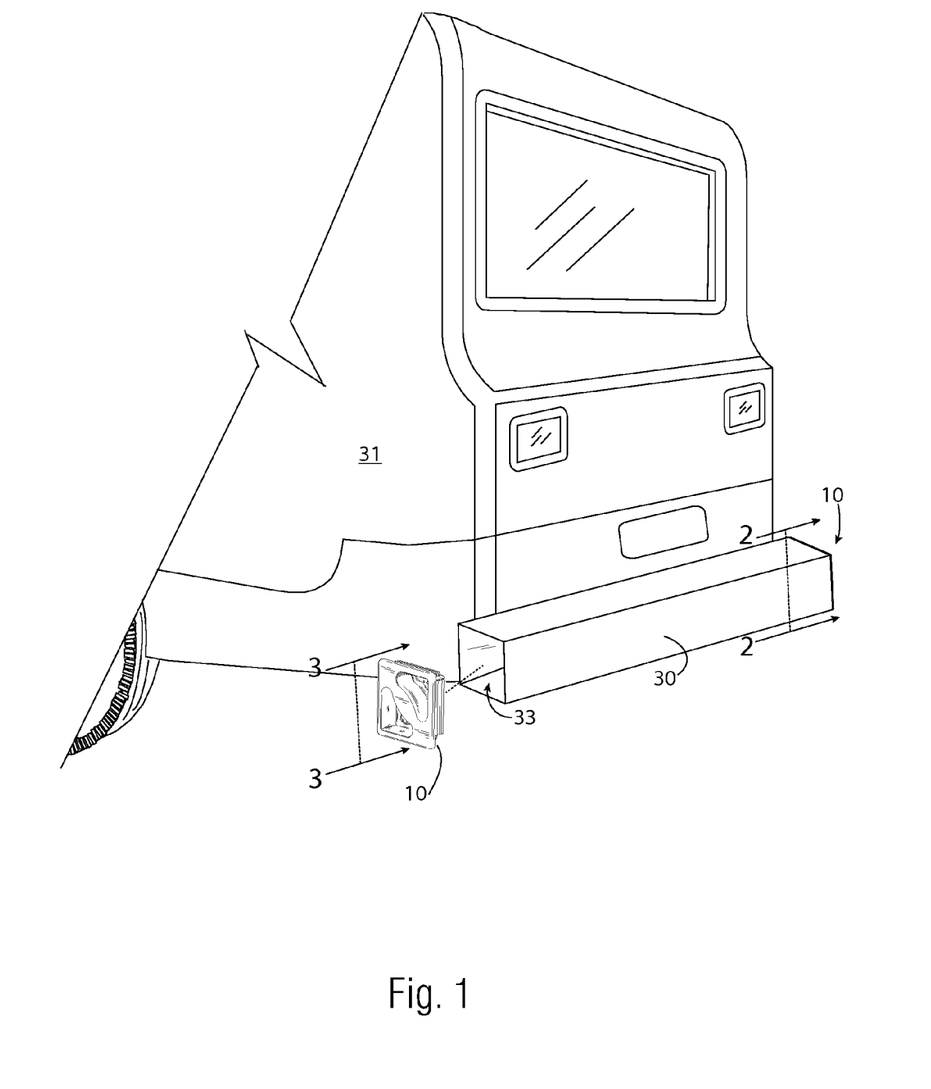
FIG. 1 illustrates a schematic rear, side perspective view of a typical RV with a bumper having one bumper plug positioned therein and one bumper plug exploded therefrom.

For a better understanding of the invention and its operation, turning now to the drawings, FIG. 1 illustrates left bumper plug 10 prior to insertion within compartment 33 of bumper 30 on vehicle 31 and right bumper plug 10 fully inserted. Preferred bumper plugs 10 are provided for securing the open ends of bumper 30 and any contents therein while permitting air to flow therethrough and simultaneously preventing bugs and other pests from entering bumper compartment 33. Each bumper plug 10 is made of a flexible material, such as plastic and is preferably formed by conventional molding from a low density polyethylene.

Figure 2:
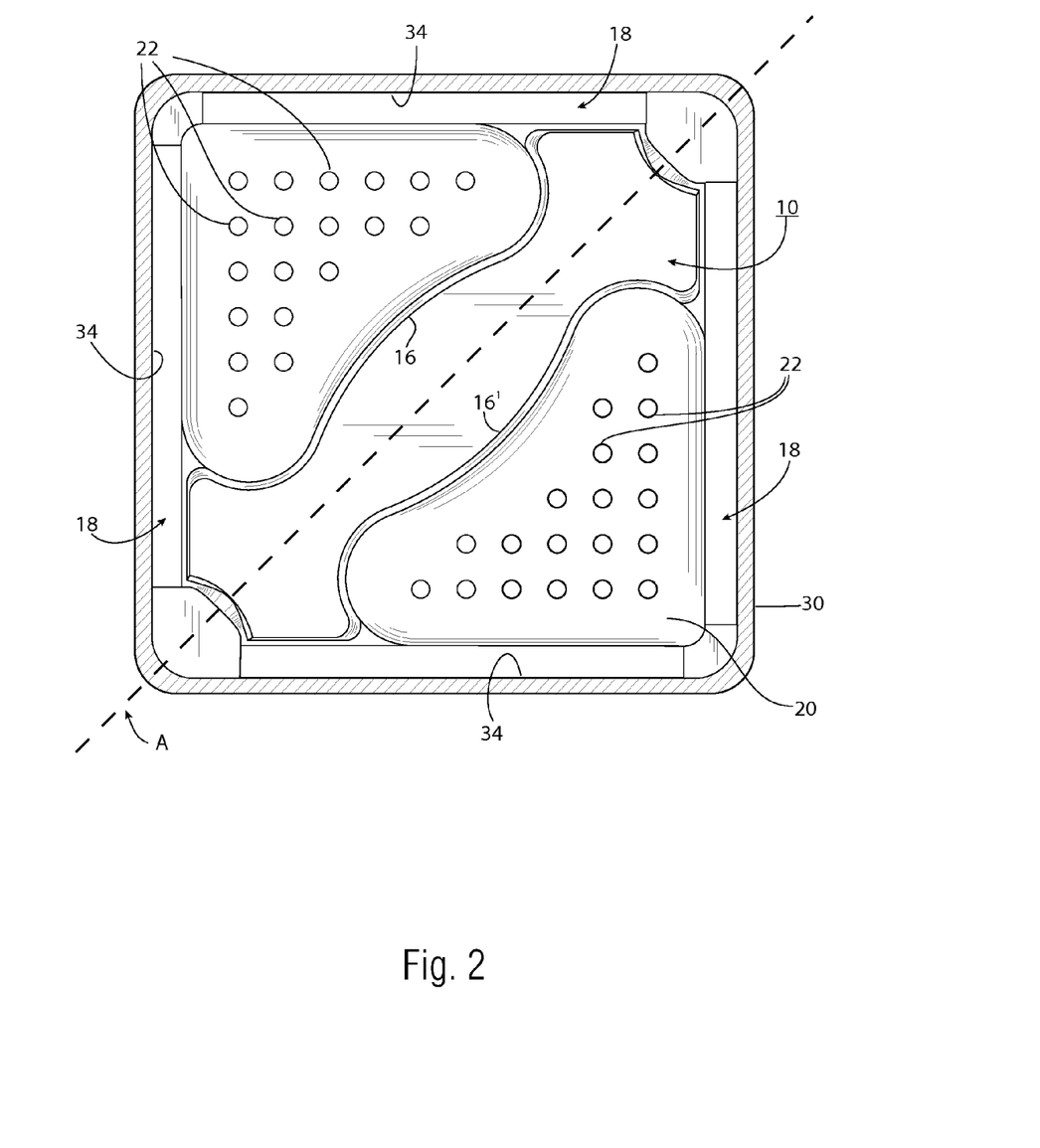
FIG. 2 demonstrates a rear plan view of the bumper plug contained in the bumper as seen in FIG. 1 along lines 2-2.
Figure 3:
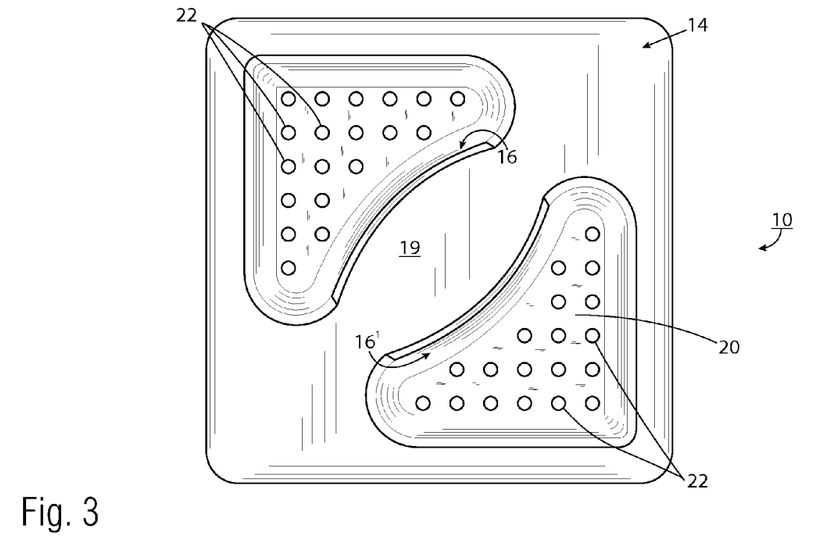
FIG. 3 shows a front view of the bumper plug as seen in FIG. 1 along lines 3-3.
Figure 4:
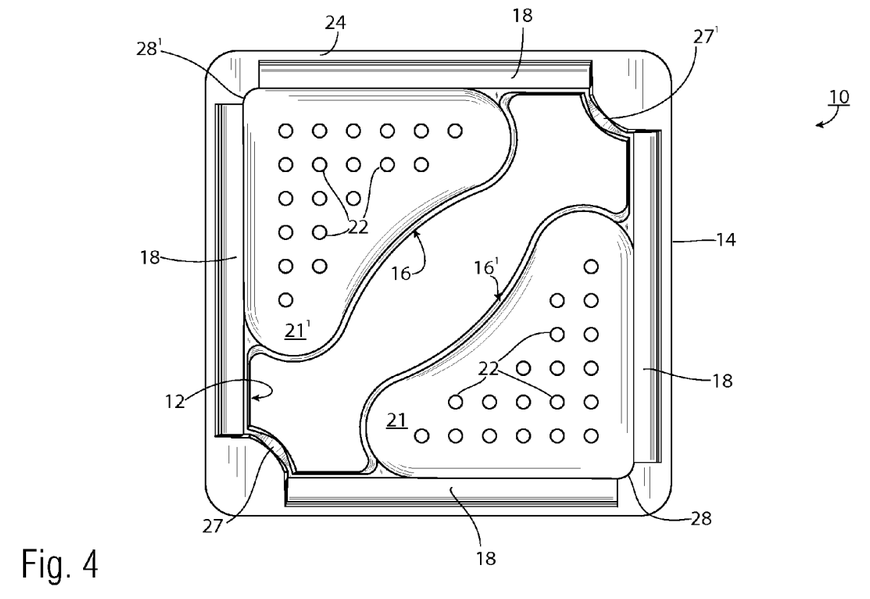
FIG. 4 depicts a rear view of the bumper plug as seen in FIG. 3.
Figure 5:
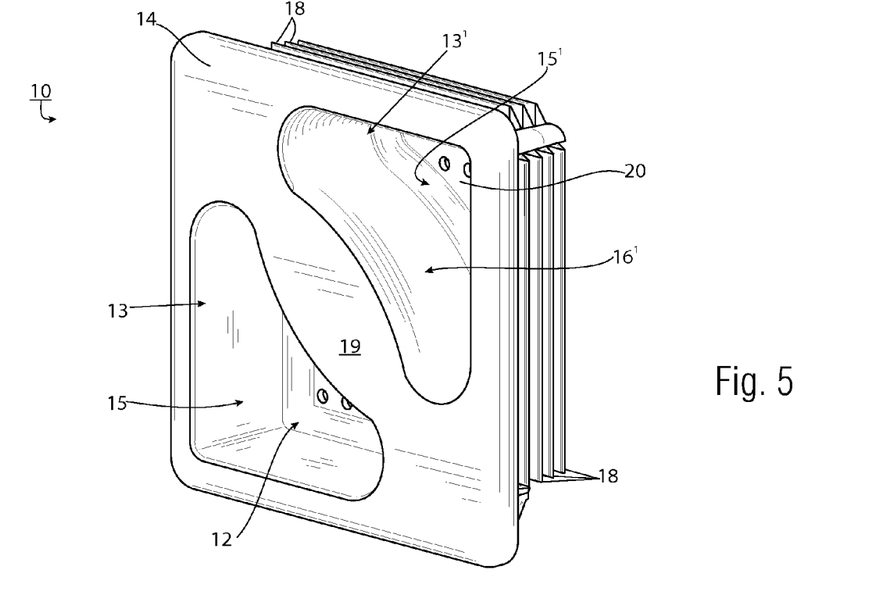
FIG. 5 pictures a front, top, right side perspective view of the bumper plug as seen in FIG. 1.
Figure 6:
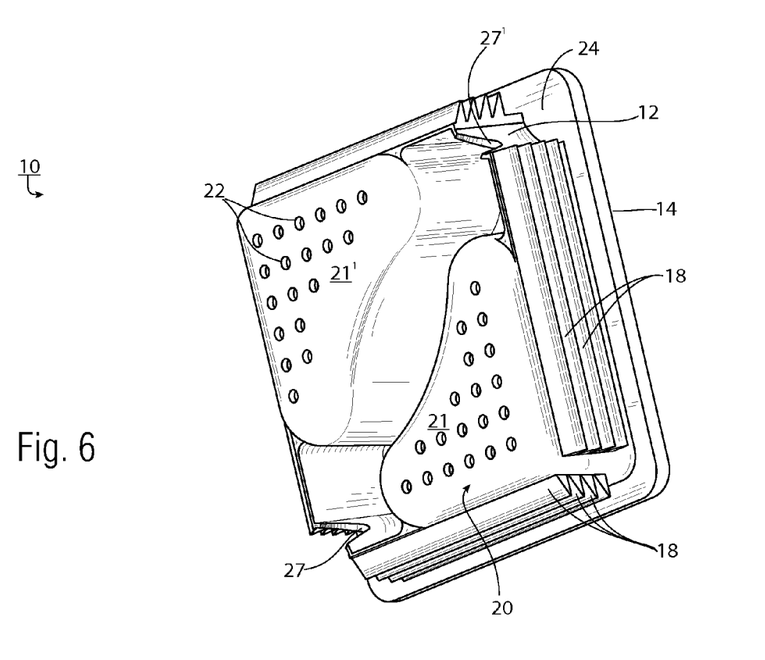
FIG. 6 features a rear, bottom, left side perspective view of the bumper plug as seen in FIG. 5.
Figure 7:
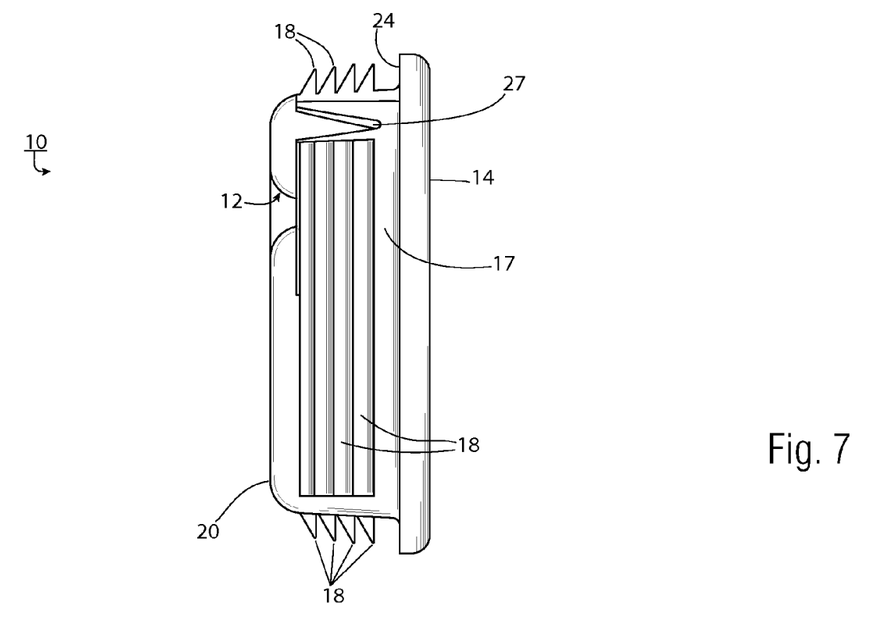
FIG. 7 illustrates a left side elevational view of the bumper plug as seen in FIG. 6.
Figure 8:
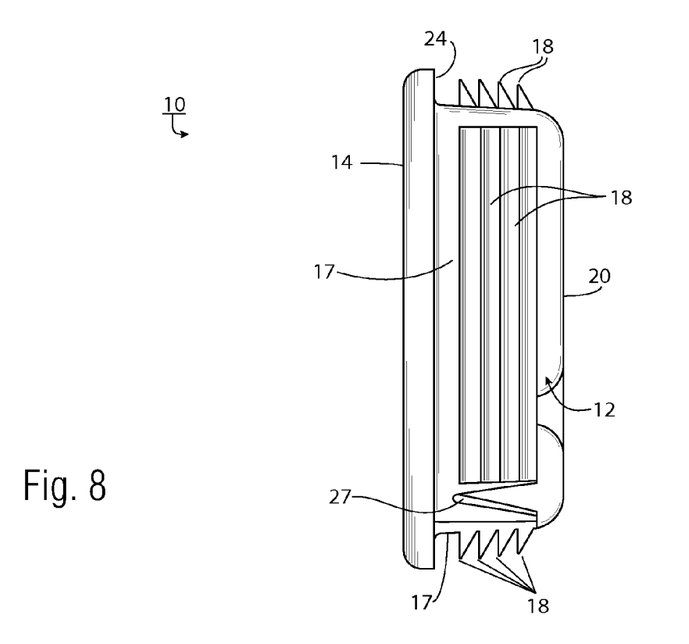
FIG. 8 illustrates a right side elevational view of the bumper plug as seen in FIG. 6.

As seen in various views in FIGS. 2-10, bumper plug 10 includes front 14, body 12, and rear 20, with front 14 and rear 20 integrally formed with body 12. Front 14 of bumper plug 10 defines openings 13, 13' having central portion or handle 19 therebetween as shown in FIG. 5. Body 12 with rear 20 defines cavities 15, 15' having respectively, inner body walls 16, 16' which are adjacent or joined to handle 19. Bumper plug 10 also includes four (4) rows of grippers 18 as seen in FIGS. 7, 8, 9 and 10 attached in longitudinal alignment to four (4) exterior walls 17 of body 12. Exterior walls 17 somewhat form a square (FIG. 4) having a pair of opposing inwardly rounded V-shaped notches 27, 27' formed therein as also shown in FIGS. 6, 7 and 8. Notches 27, 27' allow for greater flexing of body 12 during insertion and removal of plug 10 from bumper 30. Rear 20 as seen in FIG. 4 includes opposing halves 21, 21' each having a plurality of apertures 22 formed therein to provide for an insect deterrent and ventilation for airflow therethrough. Inwardly rounded V-shaped notches 27, 27' allow for flexibility of body 12 such that when manual pressure is applied to inner body walls 16, 16' (FIG. 3) within cavities 15, 15' opposing body halves 21, 21' are flexed towards each other to somewhat reduce the size of body 12. Openings 13, 13' created in plug front (FIG. 5) and cavities 15, 15' defined by plug body 12 and rear 20 as seen in FIG. 6 allow a user to grasp handle 19 and apply manual pressure to inner body walls 16, 16' causing halves 21, 21' to flex and reduce the size of bumper plug 10 for insertion or removal. Side walls 16, 16' include a slight outward curvature proximate handle 19 which may assist during grasping.

Figure 11:
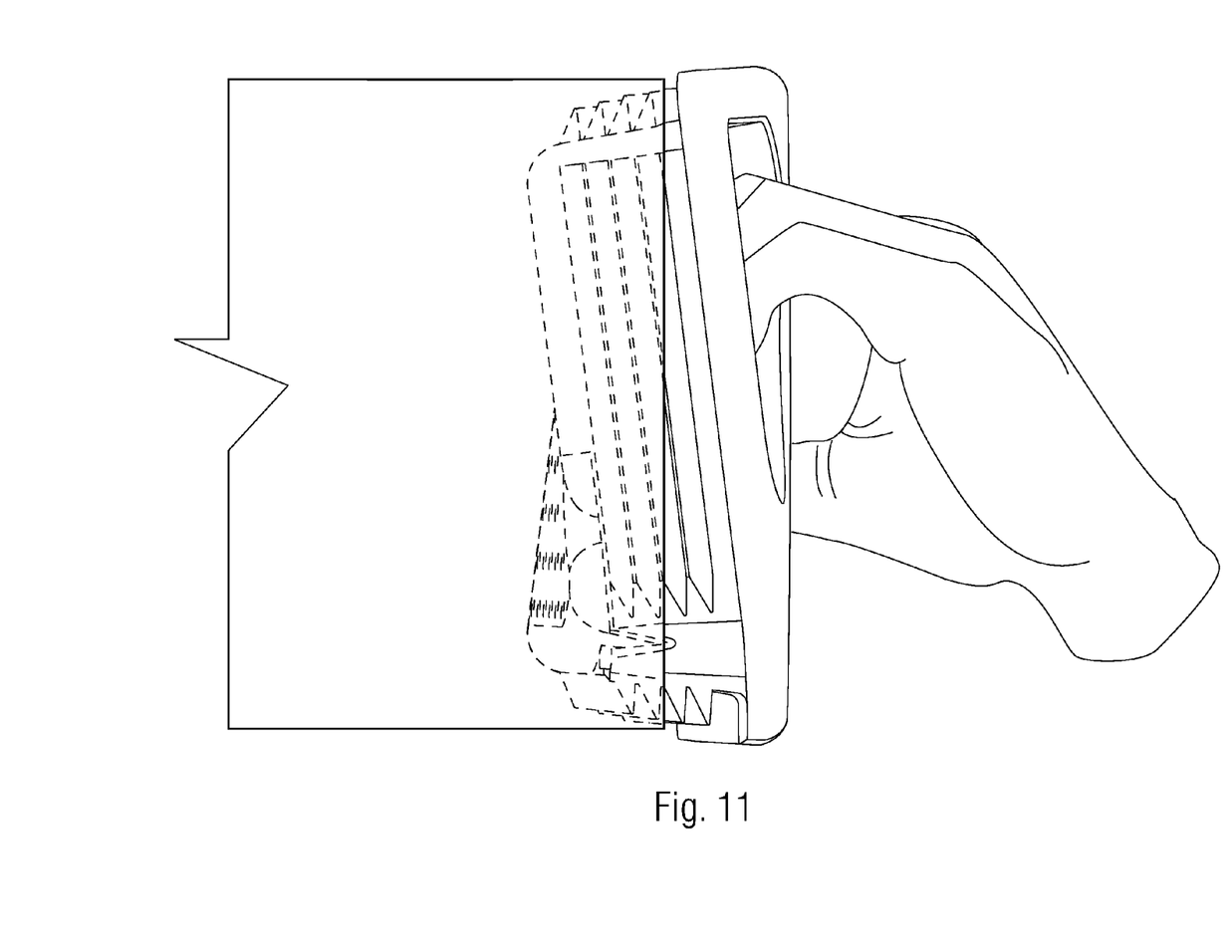
FIG. 11 schematically illustrates a left side view of the bumper plug being flexed while inserted into the bumper compartment.

In FIG. 2 a rear view of bumper plug 10 is seen inserted within bumper 30 whereby grippers 18 tightly engage inner walls 34 of bumper compartment 33. Before insertion, as seen in FIG. 11 user 40 (partially seen) grasps cavities 15, 15' using all fingers in one cavity and the thumb in the opposing cavity with handle 19 therebetween and applies manual pressure to each of body walls 16, 16'. As previously described, hand pressure causes halves 21, 21' of plug body 12 to flex in an inward fashion, causing V-shaped notches 27, 27' to give or come together providing allowance for the outer dimensions of bumper plug 10 to be reduced for insertion or removal purposes. During such manual pressure opposing corners 28, 28' (FIG. 4) of halves 21, 21' extend inwardly towards central axis A (FIG. 2) of handle 19.

FIG. 11 illustrates a side view of bumper plug 10 being inserted into RV bumper 30. Once bumper plug 10 has been reduced (flexed), user 40 may then insert bumper plug 10 into the end of a vehicle bumper such as bumper 30 and thereafter release the manual pressure applied. Release of bumper plug 10 allows plug body 12 to relax and expand to its normal posture causing plug grippers 18 to frictionally engage inner walls 34 of bumper compartment 33 as seen in FIG. 2. This frictional interaction allows a user to store items such as hoses (not shown) securely in bumper compartment 33 without fear of losing such items or bumper plugs 10 when vehicle 31 is in motion or otherwise.

Figure 9:
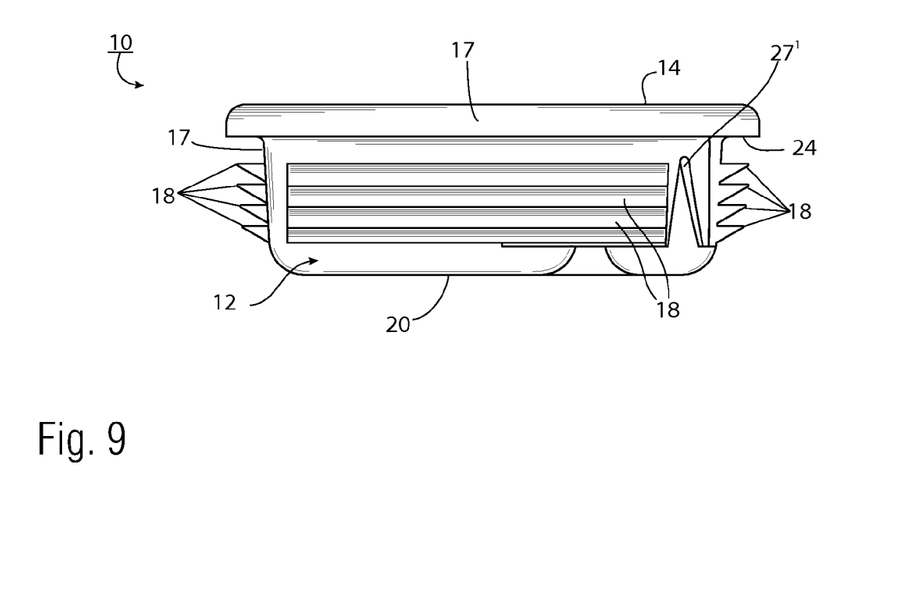
FIG. 9 illustrates a top elevational view of the bumper plug as seen in FIG. 6.
Figure 10:
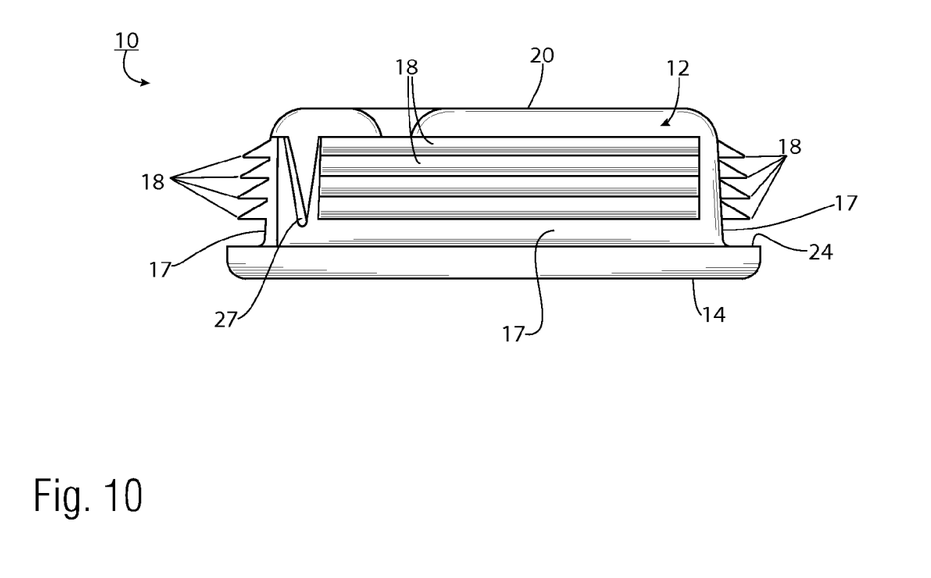
FIG. 10 illustrates a bottom elevational view of the bumper plug as seen in FIG. 6.

FIGS. 3 and 4 illustrate front and rear elevational views of bumper plug 10, respectively, while FIGS. 5 and 6 depict perspective front and rear views, FIGS. 7 and 8 picture left and right side views and FIGS. 9 and 10 show top and bottom views. Bumper plug 10 serves additional purposes for example, in the event that the contents (not shown) of bumper compartment 33 are damp, cavities 15, 15' with apertures 22 provide ventilation permitting the flow of air therethrough thus allowing any moisture or odors to dissipate. As seen in FIG. 1, bumper plugs 10 are positioned on each end of bumper 30 allowing air flow from end to end.

Apertures 22 also serve as a screen to prevent bugs and other pests from accessing compartment 33 of bumper 30. For example, if a user desired to store a waste hose in bumper compartment 33, the user would insert bumper plugs 10 on each end of bumper 30 to secure the hoses (not shown) therein, allowing a hose such as a sewer hose to dry while simultaneously preventing insects from being attracted to any residual waste remaining in the hose.

Plug front 14 extends beyond plug body 12, creating plug lip 24 as seen in FIGS. 9 and 10. Plug lip 24 serves to seal bumper compartment 33 completely and securely while preventing bumper plug 10 from being inserted excessively into bumper compartment 33. Lip 24 of front 14 is sufficiently thick enough to provide the rigidity needed to assist in maintaining plug 10 in a stiff manner while V-shaped notches 27, 27' provide the open space required to flex halves 21, 21' to reduce the size of plug 10 for insertion and removal purposes.

In FIGS. 7 and 8 a plurality of grippers 18 having a right triangular shape are located on exterior walls 17 of plug body 12. Preferably four (4) flexible grippers 18 are located on each of walls 17 whereby the straight side of the right triangles are parallel to lip 24 of front 14 as seen in FIG. 8 leaving the adjacent angled side sloping toward front 14. This positioning assists in placement of plug 10 within bumper compartment 33 and provides for frictional engagement between grippers 18 and inner walls 34 of bumper compartment 33. Although grippers 18 are illustrated having preferably a right triangular shape other shapes and structures of grippers 18 are also contemplated as well as the number of grippers 18 on each side.

The preferred method of use of bumper plug 10 as shown in FIG. 11 includes the step of first forming bumper plug 10 such as by conventional plastic molding techniques using a low density polyethylene or other suitable plastic. As would be understood bumper plug 10 can be formed in various sizes to fit specific RV bumper compartments. Once formed, the bumper plug can be manually flexed and inserted into the bumper compartment as earlier described. Upon release, the bumper plug will resume its relaxed posture and tightly grip the inside walls of the bumper compartment with the plurality of grippers. After use, the bumper plug can be grasped as earlier described with the fingers in one cavity and the thumb in the opposing cavity, manually squeezed with the finger tips and thumb tip applying pressure to the side walls for inwardly flexing the body halves whereby the grippers are released from the inner walls and the plug can then be urged from the bumper compartment for access thereto.

The illustrations and examples provided herein are for explanatory purposes and are not intended to limit the scope of the appended claims.

We claim:

1. A plug for a bumper comprising: a body, a front, said front affixed to said body, said front defining an opening, said body defining a cavity, said front opening in communication with said body cavity, a body inner side wall, said body inner side wall contiguous said front, a rear, said rear defining at least one aperture, said rear attached to said body inner side wall, a gripper, said gripper attached to said body, wherein said aperture acts as an insect screen.

2. The plug of claim 1 wherein said front extends beyond said body to form a lip.

3. The plug of claim 1 wherein said plug is molded from a flexible plastic.

4. The plug of claim 1 wherein said body defines a V-shaped notch.

5. A plug for a bumper comprising: a front, a body, said front affixed to said body, a rear, said rear defining a plurality of apertures, said rear attached to said body, a plurality of grippers, said plurality of grippers positioned on an outer surface of said body, said plurality of grippers longitudinally aligned and defining a gap between adjacent grippers.

6. The plug of claim 5 wherein said plurality of grippers are positioned in horizontal rows along the outer surface of said body.

7. The plug of claim 6 wherein said horizontal rows are parallel.

8. The plug of claim 5 wherein each of said grippers comprises a triangular cross section.

9. The plug of claim 5 wherein said front extends beyond said body to form a lip.

10. The plug of claim 5 wherein said plug is integrally formed from a flexible plastic.

11. The plug of claim 5 wherein said front defines a pair of opposing openings, a handle, said handle positioned between said pair of openings.

12. The plug of claim 10 wherein said body defines a pair of cavities, each of said front openings in communication with different ones of said pair of cavities, said pair of cavities each defining a body inner side wall, each of said body inner side walls contiguous said handle.

13. The plug of claim 5 wherein said body defines an opposing pair of V-shaped notches.

14. A method of closing the end of a tubular bumper comprising the steps of:
   a) providing a flexible plug having a front affixed to a body with a plurality of grippers affixed to an outer surface of the body and a bottom surface that defines an insect screen;
   b) flexing the body during insertion into a compartment defined by the bumper; and
   c) allowing the plug to relax after insertion to bring the grippers into contact with the bumper.

15. The method of claim 14 wherein providing a flexible plug comprises the step of providing a plug with a body cavity and a top opening in communication therewith.

\* \* \* \* \*

UNITED STATES PATENT AND TRADEMARK OFFICE
CERTIFICATE OF CORRECTION

PATENT NO.       : 8,672,371 B1
APPLICATION NO.  : 13/356847
DATED            : March 18, 2014
INVENTOR(S)      : Jeffrey R. Russell and John R. Bussard It is certified that error appears in the above-identified patent and that said Letters Patent is hereby corrected as shown below:

On the Title Page

Item (73) the Assignee as "Comco Manufacturing, Inc." should correctly read "Camco Manufacturing, Inc."

Signed and Sealed this
Twenty-fourth Day of March, 2015

Michelle K. Lee
*Director of the United States Patent and Trademark Office*